(12) United States Patent
Zhang

(10) Patent No.: US 11,284,151 B2
(45) Date of Patent: Mar. 22, 2022

(54) LOUDNESS ADJUSTMENT METHOD AND APPARATUS, AND ELECTRONIC DEVICE AND STORAGE MEDIUM

(71) Applicant: Beijing Dajia Internet Information Technology Co., Ltd., Beijing (CN)

(72) Inventor: Chen Zhang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/295,735

(22) PCT Filed: Sep. 5, 2019

(86) PCT No.: PCT/CN2019/104576
§ 371 (c)(1),
(2) Date: May 20, 2021

(87) PCT Pub. No.: WO2020/103527
PCT Pub. Date: May 28, 2020

(65) Prior Publication Data
US 2021/0368230 A1 Nov. 25, 2021

(30) Foreign Application Priority Data
Nov. 23, 2018 (CN) .......................... 201811409335.3

(51) Int. Cl.
*H04N 21/439* (2011.01)
*G06F 3/16* (2006.01)
(52) U.S. Cl.
CPC ......... *H04N 21/4394* (2013.01); *G06F 3/165* (2013.01)
(58) Field of Classification Search
CPC ............................ H04N 21/4394; G06F 3/165
(Continued)

(56) References Cited

U.S. PATENT DOCUMENTS 5,506,910 A * 4/1996 Miller ...................... H03G 3/32
381/103
7,529,377 B2 * 5/2009 Nackvi ................... H04S 7/301
381/103
(Continued)

FOREIGN PATENT DOCUMENTS

CN 101154384 A 4/2008
CN 102946520 A 2/2013
(Continued)

OTHER PUBLICATIONS

International Search Report for International Application No. PCT/CN2019/104576 dated Dec. 19, 2019.
(Continued)

*Primary Examiner* — David L Ton
(74) *Attorney, Agent, or Firm* — Meunuer Carlin & Curfman LLC

(57) ABSTRACT

The present application relates to a loudness adjustment method and apparatus, and an electronic device and a storage medium, mainly relating to the technical field of multimedia. The method comprises: converting a sound signal of a multimedia resource into a first frequency domain signal; acquiring a second frequency domain signal based on the first frequency domain signal and frequency response information of a current electronic device, wherein the second frequency domain signal is used for reflecting the loudness of the first frequency domain signal when same is played on the current electronic device; and adjusting the loudness of the sound signal based on the second frequency domain signal and a target loudness, so as to obtain a target sound signal of the multimedia resource.

17 Claims, 8 Drawing Sheets

(58) Field of Classification Search
USPC .......................................... 381/98, 102, 103
See application file for complete search history.

(56) References Cited

U.S. PATENT DOCUMENTS

| | | | | |
|---|---|---|---|---|
| 8,855,322 | B2* | 10/2014 | Ryu | ............... H04R 3/007 381/55 |
| 2007/0092089 | A1* | 4/2007 | Seefeldt | ............... H03G 9/025 381/104 |
| 2008/0285775 | A1* | 11/2008 | Christoph | ............... H04S 7/301 381/99 |
| 2011/0038490 | A1* | 2/2011 | Yang | ............... H03G 5/165 381/103 |
| 2011/0274292 | A1* | 11/2011 | Fukuda | ............... H04N 21/439 381/98 |
| 2012/0063616 | A1* | 3/2012 | Walsh | ............... H03G 9/005 381/103 |
| 2013/0136277 | A1 | 5/2013 | Sudo | |
| 2014/0328500 | A1* | 11/2014 | Patwardhan | ............... H03G 5/16 381/107 |
| 2015/0215703 | A1* | 7/2015 | Paumier | ............... H03G 3/00 381/103 |
| 2015/0289057 | A1* | 10/2015 | Christoph | ............... H04R 3/04 381/98 |

FOREIGN PATENT DOCUMENTS

| | | |
|---|---|---|
| CN | 103414990 A | 11/2013 |
| CN | 103686555 A | 3/2014 |
| CN | 103702253 A | 4/2014 |
| CN | 105144290 A | 12/2015 |
| CN | 105357613 A | 2/2016 |
| CN | 106878866 | 6/2017 |
| CN | 107154263 A | 9/2017 |
| CN | 107479851 A | 12/2017 |
| CN | 108668009 A | 10/2018 |
| CN | 109547848 A | 3/2019 |
| WO | 2011019339 A1 | 2/2011 |
| WO | 2018139793 A1 | 8/2018 |

OTHER PUBLICATIONS

Notification to Grant for Chinese Application No. 2018114093353 dated Jan. 14, 2021.
Second Office Action for Chinese Application No. 2018114093353 dated Jul. 27, 2020.

* cited by examiner

LOUDNESS ADJUSTMENT METHOD AND APPARATUS, AND ELECTRONIC DEVICE AND STORAGE MEDIUM

The present application is a National Stage of International Application No. PCT/CN2019/104576, filed Sep. 5, 2019, which claims the priority of Chinese Patent Application No. 201811409335.3 filed with the Chinese Patent Office on Nov. 23, 2018 and entitled 'Loudness Adjustment Method and Apparatus, and Electronic Device and Storage Medium', and the entire contents of which are incorporated herein by reference.

FIELD

The present application relates to the field of multimedia, in particular to a method and device for adjusting loudness, electronic equipment and a storage medium.

BACKGROUND

Along with the development of the multimedia technology, people usually watch or listen to various multimedia resources through multimedia applications, wherein a short video application is just a multimedia application. In this multimedia application, the multimedia resources are mostly user generated contents (UGCs), then the loudness of sounds in a multimedia resource may vary, thereby leading to fluctuated loudness of sounds heard by the user, moreover, the loudness of sounds of multiple multimedia resources may also be different, the loudness of sounds heard by the user in the process of switching multimedia resources may also fluctuate, therefore, the loudness of multimedia resources usually needs to be adjusted.

In the related art, the loudness adjustment method is usually as follows: for a multimedia resource, an average value of sound signals of the multimedia resource is calculated, therefore, through adjustment of gains, the loudness of sound signals of the multimedia resource is adjusted to an average value. In some other loudness adjustment methods, the gain value is automatically adjusted in real time according to the amplitude of the input sound signals and a target amplitude by utilizing a manner of automatic gain control (AGC), such that the amplitude of the sound signals adjusted according to the gain value is close to the target amplitude, and the target amplitude is determined in real time according to the amplitude of the input sound signals.

The inventor found that, in the above loudness adjustment method, adjustment is performed only through sound amplitude or energy, and the frequency response of a device is not taken into consideration. The frequency response of different devices may be different, and when the same multimedia resource is played on different devices, the loudness of sounds heard by the user may be different since the frequency responses are different, therefore, in the above method, the adjusted loudness cannot completely match with the auditory characteristics of human beings. Moreover, in the above first method, only the loudness adjustment in a single multimedia resource is considered, the loudness of multiple multimedia resources may also be inconsistent, therefore, the effect of the above loudness adjustment method is poor.

SUMMARY

The present application discloses a method and device for adjusting loudness, electronic equipment and a storage medium, capable of overcoming the above problems of incomplete match between the adjusted loudness and auditory characteristics of human beings and poor effect.

According to a first aspect of an embodiment of the present application, a method for adjusting loudness is provided. The method includes: converting a sound signal of a multimedia resource into a first frequency domain signal; acquiring a second frequency domain signal based on the first frequency domain signal and frequency response information of current electronic equipment, wherein the second frequency domain signal is configured to embody loudness of the first frequency domain signal when the first frequency domain signal is played on the current electronic equipment; and obtaining a target sound signal of the multimedia resource by adjusting loudness of the sound signal based on the second frequency domain signal and target loudness.

According to a second aspect of the embodiment of the present application, a device for adjusting loudness is provided. The device includes: a conversion module, configured to convert a sound signal of a multimedia resource into the first frequency domain signal; an acquisition module, configured to acquire a second frequency domain signal based on the first frequency domain signal and frequency response information of current electronic equipment, wherein the second frequency domain signal is configured to embody loudness of the first frequency domain signal when the first frequency domain signal is played on the current electronic equipment; and an adjustment module, configured to obtain a target sound signal of the multimedia resource by adjusting loudness of the sound signal based on the second frequency domain signal and the target loudness.

According to a third aspect of the embodiment of the present application, electronic equipment is provided. The electronic equipment includes: a processor; and a memory configured to store instructions executed by the processor; where the processor is configured to: convert a sound signal of a multimedia resource into a first frequency domain signal; acquire a second frequency domain signal based on the first frequency domain signal and frequency response information of current electronic equipment, wherein the second frequency domain signal is configured to embody loudness of the first frequency domain signal when the first frequency domain signal is played on the current electronic equipment; and obtain a target sound signal of the multimedia resource by adjusting loudness of the sound signal based on the second frequency domain signal and target loudness.

According to a fourth aspect of the embodiment of the present application, a non-temporary computer readable storage medium is provided. When instructions in the non-temporary computer readable storage medium are executed by a processor of electronic equipment, the electronic equipment performs a method for adjusting loudness, and the method includes: converting a sound signal of a multimedia resource into a first frequency domain signal; acquiring a second frequency domain signal based on the first frequency domain signal and frequency response information of current electronic equipment, wherein the second frequency domain signal is configured to embody loudness of the first frequency domain signal when the first frequency domain signal is played on the current electronic equipment; and obtaining a target sound signal of the multimedia resource by adjusting loudness of the sound signal based on the second frequency domain signal and target loudness.

According to a fifth aspect of the embodiment of the present application, an application is provided. The application includes one or more instructions, the one or more instructions can be executed by a processor of electronic equipment, such that the electronic equipment performs a method for adjusting loudness, and the method includes: converting a sound signal of a multimedia resource into a first frequency domain signal; acquiring a second frequency domain signal based on the first frequency domain signal and frequency response information of current electronic equipment, where the second frequency domain signal is configured to embody loudness of the first frequency domain signal when the first frequency domain signal is played on the current electronic equipment; and obtaining a target sound signal of the multimedia resource by adjusting loudness of the sound signal based on the second frequency domain signal and target loudness.

BRIEF DESCRIPTION OF THE DRAWINGS

The accompanying drawings herein are incorporated into the description and constitute a part of the present description, illustrate the embodiments conforming to the present application, and are used for explaining the principles of the present application together with the description.

DETAILED DESCRIPTION OF THE EMBODIMENTS

A detailed description will be given here on the exemplary embodiments, and the examples are shown in the figures. When the description below involves accompanying drawings, unless otherwise represented, the same numbers in different accompanying drawings represent the same or similar elements. The embodiments described in the following exemplary embodiments do not represent all the embodiments consistent with the present application. On the contrary, they are merely examples of devices and methods which are described in detail in the accompanying claims and which are consistent with some aspects of the present application.

Figure 1:
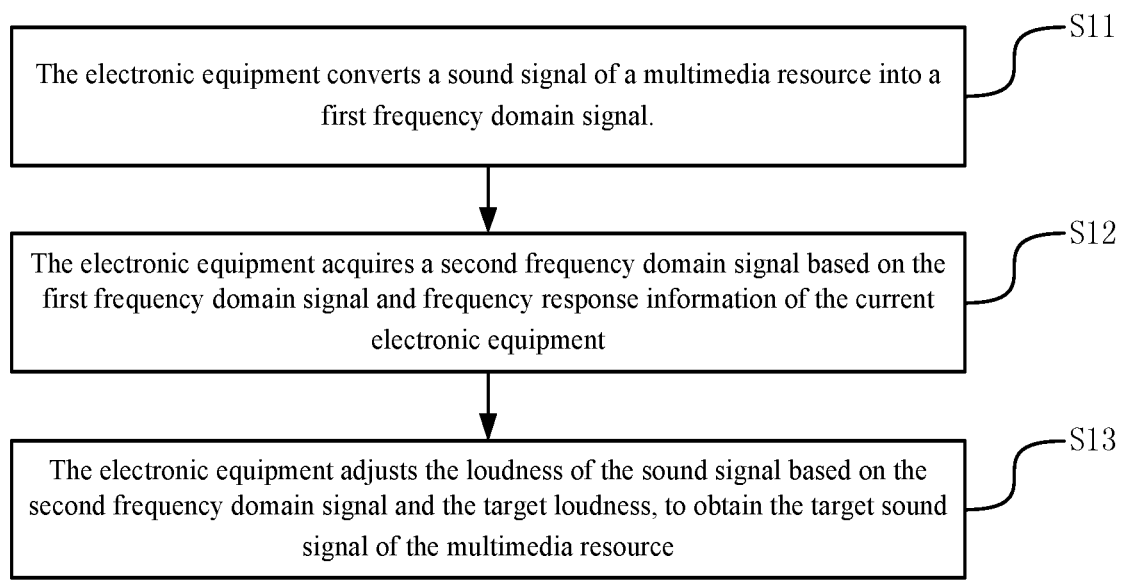
FIG. 1 is a flow chart of a method for adjusting loudness according to an exemplary embodiment.

FIG. 1 is a flow chart of a method for adjusting loudness according to an exemplary embodiment. As shown in FIG. 1, the method for adjusting loudness is applied to electronic equipment. The method includes the following steps.

In step S11, the electronic equipment converts a sound signal of a multimedia resource into a first frequency domain signal.

In step S12, the electronic equipment acquires a second frequency domain signal based on the first frequency domain signal and frequency response information of current electronic equipment. The second frequency domain signal is configured to embody loudness of the first frequency domain signal when the first frequency domain signal is played on the current electronic equipment.

In step S13, the electronic equipment adjusts the loudness of the sound signal based on the second frequency domain signal and target loudness, to obtain a target sound signal of the multimedia resource.

In the embodiments of the present application, the frequency response information of the current electronic equipment is considered, and original signals are converted into frequency domain signals which can embody the loudness of the signal when the signal is played on the current electronic equipment, therefore, the original signal is adjusted based on the frequency domain signal and the target loudness, then the loudness of the adjusted sound signal when the adjusted sound signal is played on the current electronic equipment is close to the target loudness, rather than only adjusting the loudness of the sound signal itself to match with the acoustic characteristics of the user, moreover, the loudness of the target sound signal is adjusted based on the target loudness, when multiple multimedia resources are adjusted, the obtained loudness is consistent, therefore, the problem of fluctuated sounds heard by the user can be solved, and the effect of loudness adjustment is favorable.

In some embodiments, the acquiring the second frequency domain signal based on the first frequency domain signal and the frequency response information of the current electronic equipment includes: acquiring a third frequency domain signal based on the first frequency domain signal and first information of the current electronic equipment, where the first information is configured to embody the change of an amplitude of the sound signal along with the change of a frequency; and acquiring the second frequency domain signal based on the third frequency domain signal and second information of the current electronic equipment, wherein the second information is configured to embody the change of the loudness of the sound signal along with the change of the frequency.

In some embodiments, the adjusting the loudness of the sound signal based on the second frequency domain signal and the target loudness, to obtain the target sound signal of the multimedia resource includes: acquiring a loudness adjustment value of the sound signal based on the second frequency domain signal and the target loudness; and adjusting the loudness of the sound signal based on the loudness adjustment value, to obtain the target sound signal of the multimedia resource.

In some embodiments, the acquiring the loudness adjustment value of the sound signal based on the second frequency domain signal and the target loudness includes: acquiring a maximum value and an average value of loudness of the second frequency domain signal; and acquiring the loudness adjustment value of the sound signal based on the maximum value, the average value and the target loudness.

In some embodiments, the acquiring the loudness adjustment value of the sound signal based on the maximum value, the average value and the target loudness includes: acquiring a first difference value between the target loudness and the average value; acquiring a second difference value between a loudness threshold and the maximum value; and acquiring the loudness adjustment value of the sound signal based on the first difference value and the second difference value.

In some embodiments, the acquiring the loudness adjustment value of the sound signal based on the first difference value and the second difference value includes: performing weighted summation on the first difference value and the second difference value when the first difference value and the second difference value satisfy a target condition, to obtain the loudness adjustment value of the sound signal, where the target condition is that the first difference value is greater than or equal to 0 and the first difference value is greater than the second difference value; or, acquiring the first difference value as the loudness adjustment value of the sound signal when the first difference value and the second difference value do not satisfy the target condition.

In some embodiments, the adjusting the loudness of the sound signal based on the loudness adjustment value, to obtain the target sound signals of the multimedia resource includes: acquiring a threshold of a compressor based on a loudness threshold and the loudness adjustment value; acquiring a gain value of the compressor based on the loudness adjustment value; and inputting the sound signal to the compressor, adjusting, by the compressor, the loudness of the sound signal based on the threshold and the gain value, and outputting the target sound signal of the multimedia resource.

In some embodiments, the method further includes: adjusting the loudness of the at least one frame of target sound signal to the loudness threshold when the target sound signal includes at least one frame of target sound signal with the loudness being greater than the loudness threshold.

In some embodiments, the adjusting the loudness of the at least one frame of target sound signal to the loudness threshold when the target sound signal includes at least one frame of target sound signal with the loudness being greater than the loudness threshold includes: inputting the target sound signal to a limiter, adjusting, by the limiter, at least one frame of target sound signal, with the loudness being greater than the loudness threshold, in the target sound signal, and outputting the adjusted target sound signal.

Figure 2:
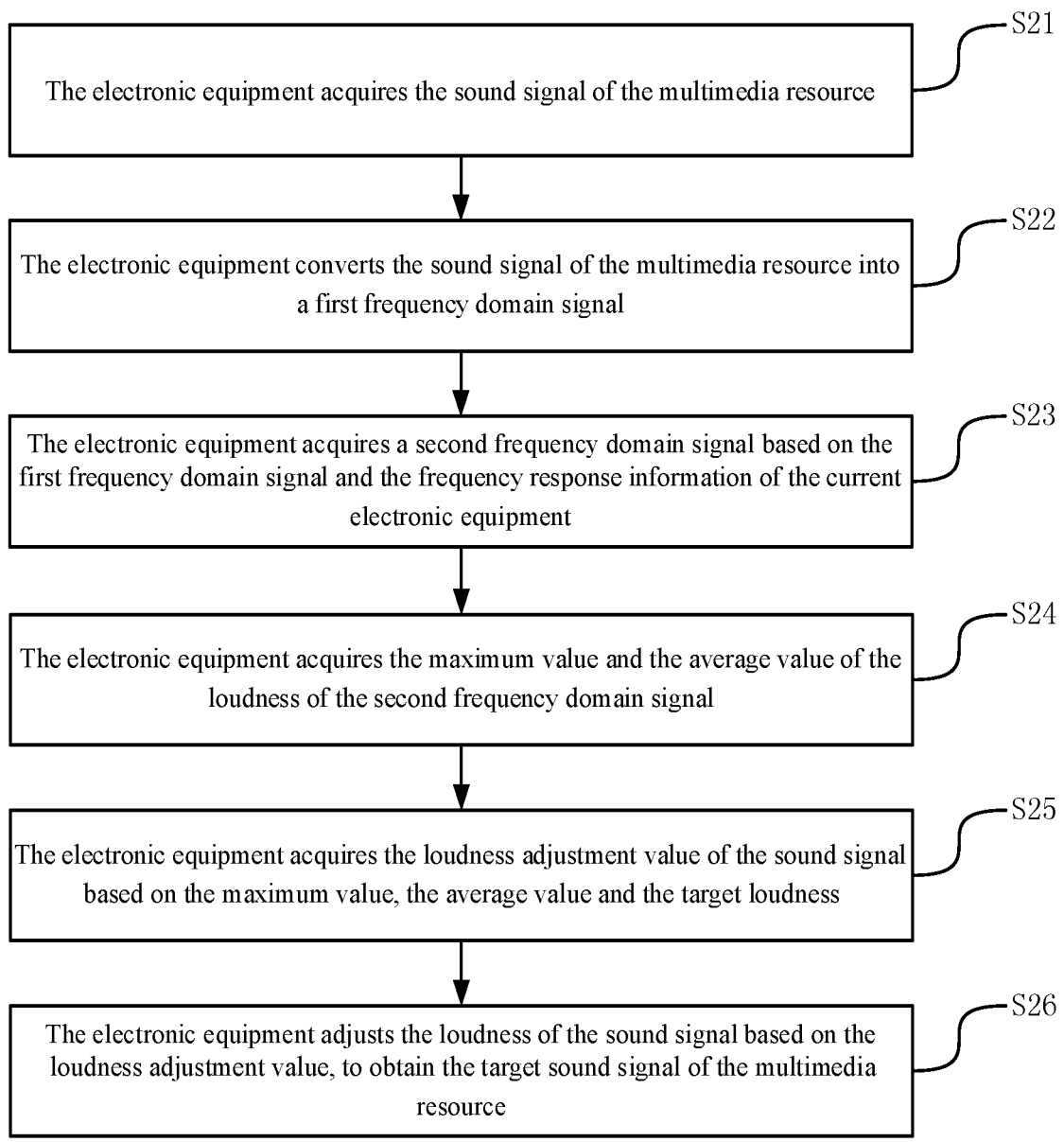
FIG. 2 is a flow chart of a method for adjusting loudness according to an exemplary embodiment.

FIG. 2 is a flow chart of a method for adjusting loudness according to an exemplary embodiment. As shown in FIG. 2, the method includes the following steps.

In step S21, the electronic equipment acquires the sound signal of the multimedia resource.

In embodiments of the present application, the electronic equipment can process the sound signal of the multimedia resource, and adjust the strength of the sound signal, such that the strength is about a fixed loudness value. In some embodiments, for multiple multimedia resources, the electronic equipment can also adjust the loudness of the sound signals of multiple multimedia resources to be about a fixed loudness value, therefore, when the multimedia resource is played on the electronic equipment, the sound signal after loudness adjustment can be played, therefore, the sound heard by the user will not fluctuate.

When the multimedia resource needs to be processed, the electronic equipment can perform the step S21, to acquire the sound signal of the multimedia resource. For example, the electronic equipment can acquire the signal on the multimedia resource audio track. In some embodiments, other manners can also be adopted to acquire the sound signal of the multimedia resource, which is not repeated redundantly herein in the embodiment of the present application. Wherein, the electronic equipment can perform the step S21 when acquiring the multimedia resource, and can also perform the step S21 when the multimedia resource needs to be played, therefore, through the following step, the loudness of the sound signal of the multimedia resource is adjusted, and the performing time of the step S21 is not defined in the embodiment of the present application.

In step S22, the electronic equipment converts the sound signal of the multimedia resource into a first frequency domain signal.

Generally, when the signal is analyzed, when the signal is analyzed on a time domain, the computing manner is complex and tedious, and the signal can be generally converted into a frequency domain, so as to analyze some characteristics of the signal on the frequency domain. In an embodiment of the present application, after the electronic equipment acquires the sound signal, the sound signal can be converted into a first frequency domain signal, therefore, based on the first frequency domain signal, how can loudness adjustment be performed on the sound signal can be further analyzed.

In some embodiments, the step S22 can be realized through Fast Fourier Transformation (FFT). The electronic equipment can perform Fast Fourier Transformation on the sound signal to obtain a first frequency domain signal. For example, suppose the sound signal is s(t), the first frequency domain signal is S0(k), the step S22 can be realized through formula 1, and the formula 1 can be S0(k)=FFT(s(t)), where S0(k) is the first frequency domain signal, FFT ( ) is the Fast Fourier Transformation function, s(t) is the sound signal, t is time, k is frequency information, the frequency information is generally a subscript of a frequency point after Fast Fourier Transformation, and the frequency represented by the subscript of the frequency point can be generally jointly determined by the subscript of the frequency point, the sampling rate and the Fast Fourier Transformation length. In this way, through the formula 1, the sound signal can be converted into the frequency domain by frames.

It should be noted that, the above sound signal can include at least one frame of sound signal, in step S22, each frame of sound signal can be converted into a frame of first frequency domain signal, to obtain at least one frame of first frequency domain signal. In some embodiments, in step S22, before the electronic equipment performs Fast Fourier Transformation on the sound signal, the sound signal can also be subjected to framing and windowing, then the sound signal can be taken as a series of stable signals, and Fast Fourier Transformation can be performed to transform the sound signal to the frequency domain, to analyze the characteristics of the sound signal. In some embodiments, the framing and windowing manners can be realized through a manner of framing or a window function, which is not defined in an embodiment of the present application, and which is not repeated redundantly herein.

In step S23, the electronic equipment acquires a second frequency domain signal based on the first frequency domain signal and the frequency response information of the current electronic equipment, where the second frequency domain signal is configured to embody the loudness of the first frequency domain signal when the first frequency domain signal is played on the current electronic equipment.

The frequency loudness information of different electronic equipment may be different, when the same multimedia resource is played on different electronic equipment, the loudness of sounds heard by the user may be different, and when the frequencies of the multimedia resource are different, when the sound signal of the same loudness is played, the loudness heard by the user may also be different. Therefore, when the electronic equipment adjusts the loudness of the sound signal of the multimedia resource, the frequency response information of the current electronic equipment can be considered, to obtain the true loudness of the sound signal when the sound signal is played on the electronic equipment, so as to adjust based on the true loudness, therefore, the loudness adjustment is more accurate, and when the adjusted sound signal is played on the current electronic equipment, the loudness heard by the user is constant.

Frequency response means that when an audio signal output at a constant voltage is connected with the system of electronic equipment, the sound pressure level generated by a sound box increases or decreases along with the change of frequency, and the phase changes along with the change of frequency, and generally, the transformation relationship between the sound pressure level or phase and the frequency is called a frequency response. The sound pressure level refers to the volume of sound, that is, the loudness.

The electronic equipment can acquire the frequency response information of the current electronic equipment, and acquire the second frequency domain signal based on the acquired frequency response information and the above first frequency domain signal obtained through transformation. In some embodiments, the frequency response information of the electronic equipment can include the first information and the second information, then in step S23, the process in which the electronic equipment considers its own frequency response information to acquire the second frequency domain signal can be realized through the following step 1 and step 2.

Step 1, the electronic equipment acquires the third frequency domain signal based on the first frequency domain signal and the first information of the current electronic equipment, wherein the first information is configured to embody the change of the amplitude of the sound signal along with the change of frequency.

When frequencies of the sound signal are different, when the electronic equipment plays the sound signal, the amplitude of the sound signal may be different from the original amplitude, moreover, on different electronic equipment, the condition in which the amplitude of the sound signal may change along with the change of frequency may also be different. Therefore, the electronic equipment can firstly perform step 1, to obtain the signal which can embody the true amplitude of the above sound signal when the above sound signal is played on the electronic equipment.

It should be noted that, the amplitude of the sound signal can be used for embodying the energy of the sound signal, then the above first information is just configured to embody the change of the energy of the sound signal along with the change of frequency. When the amplitude or energy of the sound signal changes, the loudness played by the sound signal may also change. In this way, through the step 1, the possible change of the energy when the sound signal is played on the electronic equipment is considered, then a factor which influences the possible change of the loudness of a sound signal on the electronic equipment is considered, then the loudness of the sound signal obtained after analysis is closer to the loudness during actual playing, subsequently, after the loudness of the sound signal is adjusted, the loudness of the adjusted sound signal when the sound signal is played on the electronic equipment is more accurate, and the loudness can be more accurately maintained at about a fixed loudness.

In some embodiments, the first frequency domain signal includes at least one frame of first frequency domain signal, for each frame of first frequency domain signal, the electronic equipment can take the first information of the current electronic equipment as the weight of the first frequency domain signal, so as to perform weighting on the first frequency domain signal based on the first information of the current electronic equipment to obtain a third frequency domain signal. In some embodiments, for each frame of first frequency domain signal, the value corresponding to each frequency information of the third frequency domain signal corresponding to the first frequency domain signal is a product of the value of the first information corresponding to the frequency information and the value of the first frequency domain signal corresponding to the frequency information. Further, in step 1, the first information of the first frequency domain signal and the current electronic equipment can be processed based on an equalizer (EQ), to obtain a third frequency domain signal.

Figure 3:
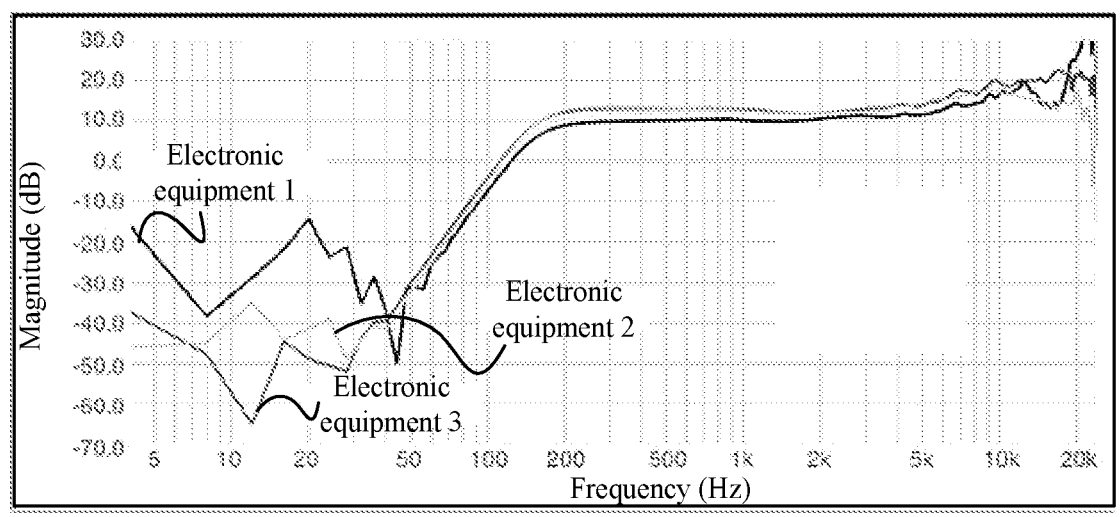
FIG. 3 is a schematic diagram of first information of electronic equipment according to an exemplary embodiment.

For example, as shown in FIG. 3, with three different electronic equipment as an example, the first information of the three electronic equipment is different, that is, the change of the amplitude of the sound signal in the three electronic equipment along with the change of frequency is different. Then the first information can be an amplitude-frequency curve of the electronic equipment, that is, a frequency characteristic curve, that is, as to the amplitude-frequency curve, the horizontal coordinate is frequency, the unit is Hz, the vertical coordinate is magnitude, and the unit is dB. After the electronic equipment acquires the first frequency domain signal, the current electronic equipment can acquire a third frequency domain signal through formula 2. In some embodiments, formula 2 can be $S1(k)=D(k)S0(k)$. Wherein, $S1(k)$ is the third frequency domain signal, $D(k)$ is the first information of the electronic equipment, and here only the first information being an amplitude-frequency curve is taken as an example, $S0(k)$ is the first frequency domain signal, k is the frequency information, and the frequency information is generally the subscript of the frequency point after Fast Fourier Transformation.

Step 2, the electronic equipment acquires the second frequency domain signal based on the third frequency domain signal and the second information of the current electronic equipment, wherein the second information is configured to embody the change of the loudness of the sound signal along with the change of frequency.

In step 1, the condition in which the sound signal in the current electronic equipment changes along with the change of frequency has been considered, that is, the change of energy of sound signal is considered, however, energy is only one factor influencing loudness change, rather than loudness, the electronic equipment also needs to convert it into loudness change, therefore, the electronic equipment can also acquire the second frequency domain signal based on the second information of the current electronic equipment and the above third frequency domain signal, such that the second frequency domain signal can embody the true loudness of the sound signal when the sound signal is played on the electronic equipment.

In some embodiments, the first frequency domain signal includes at least one frame of first frequency domain signal, correspondingly, the third frequency domain signal obtained in the above step 1 can also include at least one frame of third frequency domain signal. For each frame of third frame domain signal, the electronic equipment can take the second information of the current electronic equipment as the weight of the third frequency domain signal, so as to perform weighting on the third frequency domain signal based on the second information of the current electronic equipment, to obtain a second frequency domain signal. In some embodiments, for each frame of third frequency domain signal, the value corresponding to each frequency information of the second frequency domain signal corresponding to the third frequency domain signal is the product of the value of the second information corresponding to the frequency information and the value of the third frequency domain signal corresponding to the frequency information. Further, in the step 2, the third frequency domain signal and the second information of the current electronic equipment can also be processed based on an equalizer (EQ), to obtain the second frequency domain signal.

Figure 4:
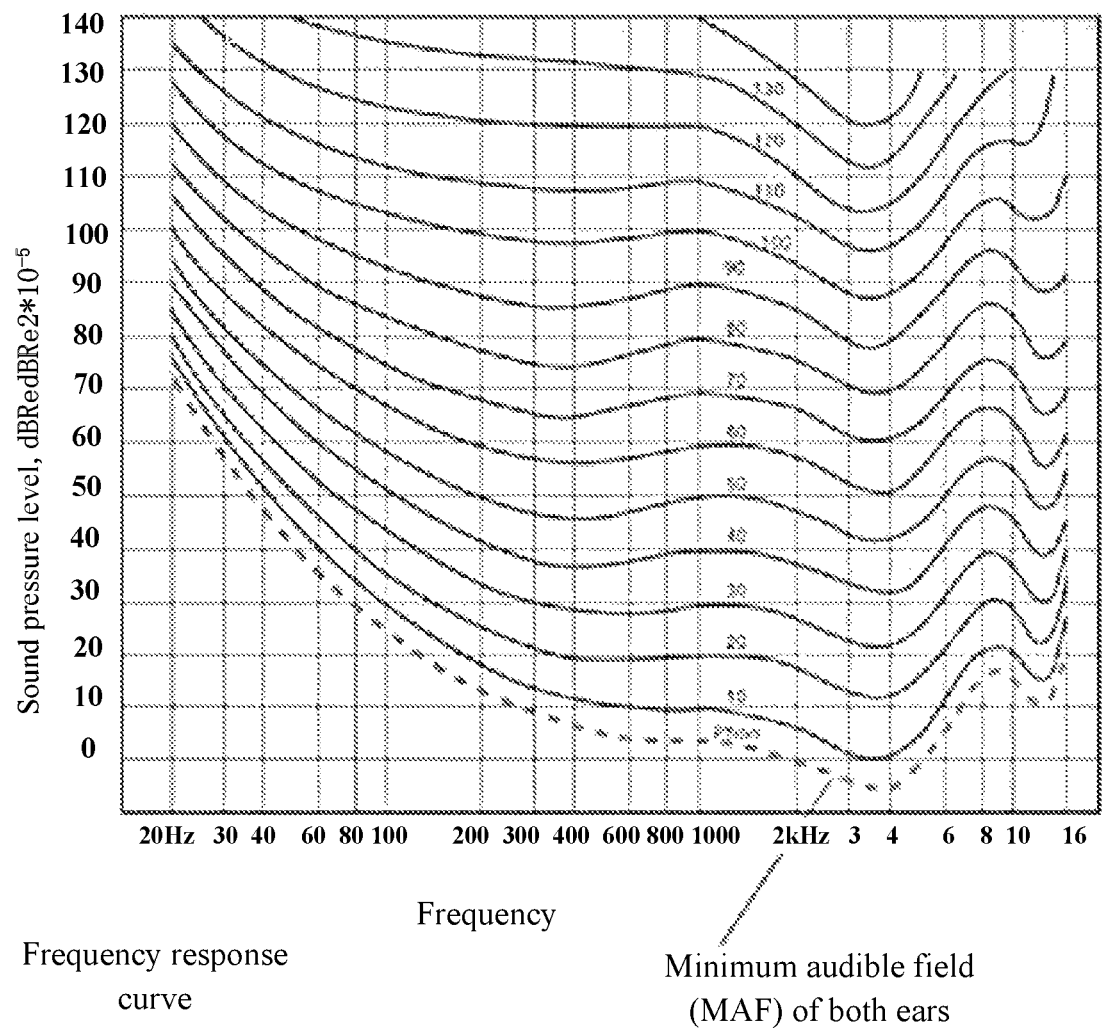
FIG. 4 is a schematic diagram of second information of electronic equipment according to an exemplary embodiment.

For example, as shown in FIG. 4, the second information can be a sound pressure level-frequency curve of the electronic equipment, that is, a frequency response curve, wherein the sound pressure level is just the volume of sound, and can be used for reflecting loudness of a sound signal. As to the sound pressure level-frequency curve, the horizontal coordinate is frequency, the unit is Hz, the longitudinal coordinate is the sound pressure level, and the unit is $dBRe2*10^{-5}$. In the sound pressure level-frequency curve, the minimum audible field (MAF) of both ears is further available, wherein the minimum audible field of both ears can be used for representing the range of loudness capable of being heard by both ears of human beings. After the electronic equipment acquires the third frequency domain signal, the current electronic equipment can acquire the second frequency domain signal through formula 3. In some embodiments, the formula 3 can be as follows: $S2(k)=L(k)S1(k)$. Wherein $S1(k)$ is the third frequency domain signal, $L(k)$ is the second information of the electronic equipment, and here only the first information being an amplitude-frequency curve is taken as an example, $S2(k)$ is the second frequency domain signal, k is the frequency information, and the frequency information is generally the subscript of the frequency point after Fast Fourier Transformation.

It should be noted that, through the above step 1 and step 2, the second frequency domain signal corresponding to the first frequency domain signal can be acquired, and the second frequency domain signal can embody the true loudness of the first frequency domain signal when the first frequency domain signal is played on the current electronic equipment, to determine the loudness adjustment value based on the true loudness, such that the loudness of the adjusted sound signal is actually closer to a fixed loudness, and the playing effect is better.

In some embodiments, only the frequency response information of the current electronic equipment including the first information and the second information to perform the above step 1 and step 2 is taken as an example above for illustration, the step S23 can also be realized through other manners. For example, the electronic equipment can further acquire the third information based on the above first information and second information, the third information can include the amplitude of the sound signal and the change of the loudness on the electronic equipment, to acquire the second frequency domain information based on the third information and the first frequency domain information. In some embodiments, the electronic equipment can further store frequency response information of the electronic equipment, to directly perform step S23, which is not repeated redundantly herein in the embodiment of the present application.

In step S24, the electronic equipment can acquire the maximum value and the average value of the loudness of the second frequency domain signal.

After the electronic equipment acquires the second frequency domain signal which can embody the true loudness of the sound signal when the sound signal is played on the electronic equipment, the electronic equipment can determine how to adjust the loudness based on the second frequency domain signal. For example, the loudness adjustment value can be determined, and the loudness adjustment value can be determined based on the above true loudness, such that the loudness adjustment is more accurate.

In some embodiments, when the electronic equipment determines the loudness adjustment value, the difference between the loudness of the sound signal and the target loudness can also be considered, and the problem of sound signal distortion possibly arising in the loudness process can also be considered, therefore, the loudness adjustment value can be determined based on the loudness information of the second frequency domain signal and the target loudness through step S24 and the following step S25. Wherein the target loudness is the loudness of the sound signal wanted to be adjusted. The target loudness can be preset by those skilled in the art, and can also be adjusted by a user according to his own habits. For example, the target loudness can be a number between −10 dB to −13 dB, the loudness experience when the user hears the sound signal of the target loudness is better, of course, the target loudness can also be other numbers, and the value of the target loudness is not defined in the embodiment of the present application.

In some embodiments, the loudness information of the second frequency domain information can be a maximum value and an average value of the loudness of the second frequency domain signal, moreover, the second frequency domain signal can further include at least one frame of second frequency domain signal, and the process in which the electronic equipment acquires the maximum value and the average value can be realized through the following step 1 to step 3.

Step 1, the electronic equipment acquires the loudness of each frame of the second frequency domain signal, to obtain at least one loudness.

In some embodiments, the electronic equipment can acquire the loudness of each frame of second frequency domain signal according to formula 4, and the formula 4 can be as follows: $Loudness(i)=10*\log 10(Sum(S2(k)*S2(k)))$, wherein $Loudness(i)$ is the loudness of the $i^{th}$ frame of second frequency domain signal, i is the identification of frame, log is a logarithmic function, Sum ( ) is a summation function, $S2(k)$ is a second frequency domain signal, k is the frequency information, and the frequency information is generally the subscript of the frequency point after Fast Fourier Transformation. Then in formula 4, $Sum (S2(k)*S2(k))$ refers to summation of squared values of the values of the second frequency domain signals from the smallest frequency point to the maximum frequency point.

In some embodiments, the step 1 can also be realized through other implementing manners, and the loudness acquiring manner of each frame of second frequency domain signal is not defined in the embodiment of the present application. After the electronic equipment acquires at least one loudness of at least one frame of second frequency domain signal, the electronic equipment can perform the following step 2 and step 3.

Step 2, the electronic equipment acquires the maximum loudness in at least one loudness as the maximum value of the loudness of the second frequency domain signal.

In some embodiments, step 2 can be realized through formula 5, and formula 5 can be as follows: $Loudness\_max=Max(Loudness(i))$, wherein $Loudness\_max$ is the maximum value of the loudness of the second frequency domain signal, Max ( ) is a function which takes the maximum value, $Loudness(i)$ is the loudness of the $i^{th}$ frame of second frequency domain signal, and i is the identification of frame. In some embodiments, step 2 can further be realized through other implementing manners, which is not defined in the embodiment of the present application.

Step 3, the electronic equipment acquires the average value of at least one loudness as an average value of the loudness of the second frequency domain signal.

In some embodiments, step 2 can be realized through formula 6, and formula 6 can be as follows: Loudness_avg=Average(Loudness(i)), wherein Loudness_avg is an average value of the loudness of the second frequency domain signal, Average ( ) is a function for averaging, Loudness(i) is the loudness of the $i^{th}$ frame of second frequency domain signal, i is the identification of frame. In some embodiments, step 2 can further be realized through other implementing manners, which is not defined in the embodiment of the present application.

It should be noted that, the electronic equipment can simultaneously perform the above step 2 and step 3, can also firstly perform step 2 and then perform step 3, and can also firstly perform step 3 and then perform step 2, and the performing sequence of the above two steps is not defined in the embodiment of the present application.

In step S25, the electronic equipment acquires the loudness adjustment value of the sound signal based on the maximum value, the average value and the target loudness.

After the electronic equipment acquires the loudness information of the second frequency domain signal, the current loudness of the second frequency domain signal and the adjusted target loudness can be determined, and the loudness adjustment value to adjust the sound signal can be determined. In some embodiments, the step S25 can be realized through the following step 1 to step 3.

Step 1, the electronic equipment acquires the first difference value of the target loudness and the average value.

The first difference value can embody the difference between the target loudness and the average value of the loudness of the second frequency domain signal, if the first difference value is greater than or equal to 0, it indicates that the average loudness of the second frequency domain signal is smaller than the target loudness, if it needs to be adjusted to a target loudness, the loudness of some sound signals needs to be amplified, if the first difference value is smaller than 0, it indicates that the average loudness of the second frequency domain signal is greater than the target loudness, then during loudness adjustment, fewer sound signals need to be amplified, or even no sound signal needs to be amplified.

For example, the process in which the electronic equipment acquires the first difference value can be realized through formula 7, and the formula 7 can be as follows: Loudness_diff1=Loudness_target-Loudness_avg, wherein Loudness_diff1 is the first difference value, Loudness is the loudness, diff is used for representing a difference value, which is actually a distinction or difference. Loudness_target is the target loudness, Loudness_avg is the average value of loudness, and avg is an abbreviation of average.

Step 2, the electronic equipment acquires the loudness threshold and the second difference value of the maximum value.

The loudness threshold can be a maximum undistorted loudness value or a number approximate to the maximum undistorted loudness value, for example, the maximum undistorted loudness value of the sound signal is generally 0 dB, then the loudness threshold can be 0 dB, and the loudness of the sound signal can be controlled based on the loudness threshold, to reduce or avoid distortion possibly caused by the loudness adjustment process. In some embodiments, the loudness threshold can also be set to be other numbers approximate to 0 dB, for example, −1 dB, in this way, in the loudness adjustment process, the sound signal can be ensured to be not distorted. The number of the loudness threshold can be preset by those skilled in the art, and the value of the loudness threshold is not specifically defined in the embodiment of the present application. The second difference value can also embody the difference between the maximum value of the loudness of the second frequency domain signal and the loudness threshold.

For example, the process in which the electronic equipment acquires the second difference value can be realized through formula 8, and formula 8 can be as follows: Loudness_diff2=Loudness_thd-Loudness_max, wherein Loudness_diff2 is the second difference value. Loudness_thd is the loudness threshold, thd is an abbreviation of threshold, and Loudness_max is the maximum value of loudness.

Step 3, the electronic equipment acquires the loudness adjustment value of the sound signal based on the first difference value and the second difference value.

The electronic equipment can determine the loudness adjustment value of the sound signal based on the two difference values after acquiring the first difference value and the second difference value. The size relation between the first difference value and 0 can embody to a certain extent the difference between the loudness of the sound signal and the target loudness, while the size relationship between the first difference value and the second difference value can embody the saturated nonlinear distortion which may possibly arise when the loudness of the sound signal is adjusted to the target loudness. Therefore, when the loudness adjustment value is determined, the electronic equipment can consider the size relationship between the first difference value and 0 and the size relationship between the first difference value and the second difference value.

When the size relationship between the first difference value and 0 is different from the size relationship between the first difference value and the second difference value, the processes in which the electronic equipment acquires the loudness adjustment value can be different, and the following two conditions can be specifically included.

The first condition, when the first difference value and the second difference value satisfy a target condition, the electronic equipment can perform weighted summation on the first difference value and the second difference value, to obtain the loudness adjustment value of the sound signal, and the target condition is that the first difference value is greater than or equal to 0 and the first difference value is greater than the second difference value.

If the first difference value is greater than or equal to 0, it indicates that the average loudness of the second frequency domain signal is smaller than the target loudness, if it is adjusted to be the target loudness, the loudness of multiple frames in the sound signal needs to be amplified, moreover, the first difference value is greater than the second difference value, when the loudness of the sound signal is amplified, the loudness of part of frames of sound signals may exceed the loudness threshold, in this condition, saturated nonlinear distortion may arise, therefore, when the electronic equipment acquires the loudness adjustment value, the first difference value and the second difference value can be weighed, such that a balanced state can exist between the difference between the loudness of adjusted sound signal and the target loudness and the saturated nonlinear distortion.

For example, the electronic equipment can perform weighted summation on the first difference value and the second difference value through formula 9. Formula 9 can be as follows: Loudness_diff=a*Loudness_diff1+(1−a)*Loudness_diff2, where Loudness_diff is a loudness adjustment value, Loudness_diff1 is the first difference value, a is the weight of the first difference value, Loudness_diff2 is the second difference value, and 1−a is the weight of the second difference value. Wherein a is a regulatory factor, and the range of a can be [0, 1). The closer a is to 1, the closer the adjusted loudness is to the target loudness, however, the bigger the possibly arising saturated nonlinear distortion; the closer a is to 0, the smaller the possibly arising saturated nonlinear distortion, however, the bigger the difference between the adjusted loudness and the target loudness. That is, if Loudness_diff1>=0 and Loudness_diff1> Loudness_diff2, then the loudness adjustment value can be acquired through the above formula 9.

Wherein the regulatory factor can be set by those skilled in the art according to their own experiences, that is, the weight between the above first difference value and the second difference value can be set by those skilled in the art according to their own experiences, for example, a can be 0.8, then the weight of the first difference value is 0.8, the weight of the second difference value is 0.2, which is not defined in the embodiment of the present application.

The second condition: when the first difference value and the second difference value do not satisfy the target condition, the electronic equipment acquires the first difference value as the loudness adjustment value of the sound signal.

In the second condition, when the first difference value and the second difference value do not satisfy the target condition, three possible scenarios may be included. The first scenario: the first difference value is greater than or equal to 0, but the first difference value is smaller than or equal to the second difference value. The second scenario: the first difference value is smaller than 0, and the first difference value is smaller than or equal to the second difference value. The third scenario: the first difference value is smaller than 0, the first difference value is greater than the second difference value. In these three scenarios, when the loudness of the sound signal is adjusted to be close to the target loudness, possible saturated linear distortion may be small, then the electronic equipment does not need to consider the second difference value, but directly takes the first difference value as the loudness adjustment value. That is, Loudness_diff=Loudness_diff1.

The process of acquiring the loudness adjustment value in step S25 is illustrated above only through two conditions, the step S25 can also be implemented through other manners, for example, the electronic equipment can directly perform weighted summation on the first difference value and the second difference value, when the first difference value and the second difference value satisfy the target condition, the value of the above regulatory factor a is 1, that is, the weight of the first difference value is 1, and the weight of the second difference value is 0. Which implementing manner is specifically adopted in the process of acquiring the loudness adjustment value is not defined in the embodiment of the present application.

Step S24 and step S25 illustrate a process of acquiring the loudness adjustment value of the sound signal based on the second frequency domain signal and the target loudness, wherein the second frequency domain signal can embody the true loudness of the first frequency domain signal when the first frequency domain signal is played on the current electronic equipment, the loudness adjustment value determined based on the true loudness is more accurate, then during subsequent loudness adjustment, the loudness of the adjusted sound signal is more accurate, and is more conforming to the anticipation. Further, through the above acquiring process of the loudness adjustment value, not only the closeness degree between the loudness of the adjusted sound signal and the target loudness is considered, but also the degree of saturated nonlinear distortion possibly arising in the adjusted sound signal is also considered, therefore, the loudness is close to the target loudness while ensuring that the distortion of the adjusted sound signal is small.

In step S26, the electronic equipment adjusts the loudness of the sound signal based on the loudness adjustment value, to obtain the target sound signal of the multimedia resource.

After the electronic equipment determines the loudness adjustment value, the loudness of the sound signal can be adjusted, and the loudness of the sound signal is adjusted to be about the target loudness, to obtain the target sound signal of the multimedia resource.

In some embodiments, the loudness adjustment process can be realized based on a compressor, then correspondingly, the parameters of the compressor can be determined based on the loudness adjustment value. The major parameters of the compressor can be a threshold and a gain value, and the threshold and the gain value can be determined based on the above loudness adjustment value. In some embodiments, the step S26 can include the following steps.

Step 1, the electronic equipment acquires the threshold of the compressor based on the loudness threshold and the loudness adjustment value.

In some embodiments, the electronic equipment can acquire the third difference value between the loudness threshold and the loudness adjustment value as the threshold of the compressor. For example, step 1 can be realized through formula 10, and formula 10 can be as follows: Threshold=Loudness_thd−Loudness_diff, wherein Threshold is the threshold of the compressor, Loudness_thd is the loudness threshold, and Loudness_diff is the loudness adjustment value.

Step 2, the electronic equipment acquires the gain value of the compressor based on the loudness adjustment value.

In some embodiments, the electronic equipment can acquire the gain value of the compressor through formula 11. For example, the formula 11 can be as follows: MakeupGain=pow(10, Loudness_diff/10), wherein MakeupGain is the gain value of the compressor, pow ( ) is the function for the power, and the formula 11 is just MakeupGain=$10^{Loudness\_diff/10}$.

Step 3, the electronic equipment inputs the sound signal to the compressor, the loudness of the sound signal is adjusted by the compressor based on the threshold and the gain value, to output the target sound signal of the multimedia resource.

After the electronic equipment acquires the parameters of the compressor, the electronic equipment can input the sound signal of the multimedia resource acquired in the above step S21 into a compressor, the compressor adjusts the loudness of the sound signal based on its own parameters, and outputs the target sound signal obtained after adjustment. Wherein, the process of adjusting the loudness by the compressor is as follows: the compressor adjusts the loudness of the sound signal to a target number based on the threshold, and then amplifies the adjusted sound signal based on the gain value, to obtain the target sound signal. Since the parameters of the compressor are determined based on the loudness adjustment value, and the loudness adjustment value considers the frequency response information of the current electronic equipment, that is, possible change of the loudness when the sound signal is played on the electronic equipment is considered, therefore, the loudness of the target sound signal obtained through the above step is more conforming to the auditory characteristics of the user, and the playing effect is better.

The method for determining the parameters of a compressor is only provided above, so as to realize the process of loudness adjustment based on a compressor. The parameters of the compressor can further include other parameters, and the manner for determining parameters can also adopt other manners, the compressor adjusts the loudness of the sound signal based on the parameters, such that the adjusted loudness of the target sound signal is close to the target loudness, and distortion is small to the greatest extent. In some embodiments, when the types of the compressors are different, the step S26 can also be performed in different implementing manners. In another possible implementation manner, no compressor can also be used in step S26, instead, the loudness of the sound signal can be directly adjusted based on the loudness adjustment value, which implementing manner is specifically adopted is not defined in the embodiment of the present application.

It should be noted that, a small amount of distortion may also exist in the target sound signal obtained through the above step, then the electronic equipment can further adjust the loudness of the target sound signal, to avoid distortion. In some embodiments, when the target sound signal includes at least one frame of target sound signal with the loudness being greater than the loudness threshold, the electronic equipment can adjust the loudness of the at least one frame of target sound signal to the loudness threshold.

In some embodiments, the electronic equipment can adjust the target sound signal based on a limiter. In some embodiments, the electronic equipment can input the target sound signal into a limiter, and the limiter adjusts the at least one frame of target sound signal with the loudness being greater than the loudness threshold in the target sound signal, and outputs the adjusted target sound signal. Wherein the threshold of the limiter can be the loudness threshold, therefore, in the limiter, if the loudness of a certain frame of sound signal is greater than the loudness threshold, then the limiter can set the loudness of the sound signal to the loudness threshold. In this way, saturated overflow distortion can be further avoided through a limiter, and the playing effect of the obtained target sound signal is better.

Figure 5:
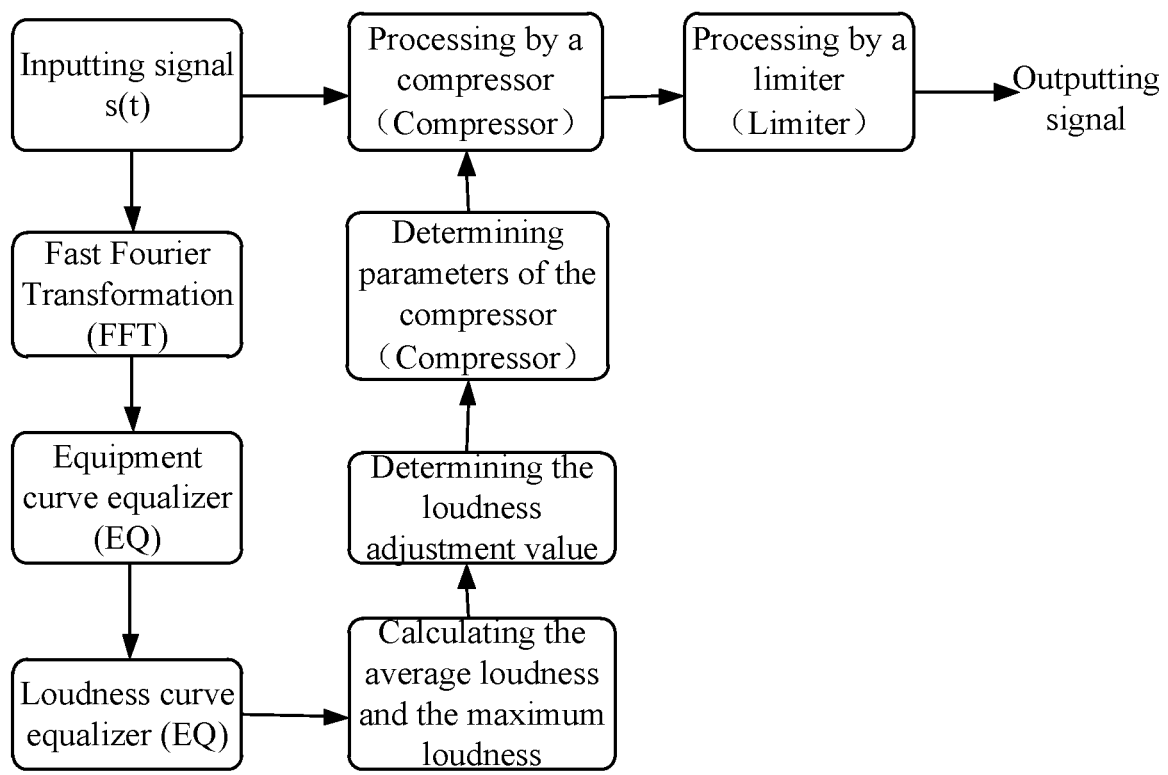
FIG. 5 is a flow chart of a method for adjusting loudness according to an exemplary embodiment.

For example, FIG. 5 shows a specific example of the above loudness adjustment method, as shown in FIG. 5, the electronic equipment can input signal s(t), the signal s(t) is just the sound signal of the multimedia resource, therefore, the electronic equipment can perform Fast Fourier Transformation (FFT) on the sound signal, that is, corresponding to the above step S22, and through the equipment curve (EQ) and the loudness curve (EQ), the equipment curve and the loudness curve are just corresponding to the first information and the second information in the above step S23. Until then, the electronic equipment obtains the second frequency domain signal, then the electronic equipment can calculate the average loudness and the maximum loudness, that is, corresponding to the process of acquiring the maximum value and the average value of the loudness in the above step S24, after the electronic equipment obtains the average loudness and the maximum loudness, the electronic equipment can determine the strength adjustment value, that is, corresponding to step S25, afterwards, the electronic equipment determines the parameters of the compressor based on the loudness adjustment value, then the electronic equipment can process the input signal s(t) by using a compressor, and input the information output by the compressor into a limiter, the limiter further processes and finally outputs signals, and the output information is just the acquired target sound signal in step S26.

Step S24 to step S26 is a process in which the loudness of the sound signal is adjusted based on the second frequency domain signal and the target loudness to obtain the target sound signal of the multimedia resource. The second frequency domain signal can embody the loudness of the first frequency domain signal when the first frequency domain signal is played on the electronic equipment, that is, the second frequency domain signal can embody the loudness of the sound signal of the multimedia resource when the sound signal of the multimedia resource is played on the electronic equipment, therefore, in consideration of this point, the loudness of the target sound signal obtained after processing the loudness of the sound signal in combination with the target loudness is more conforming to the anticipation, and is more conforming to the auditory characteristic of the user, and the playing effect is better.

Step S23 to step S26 is a process in which the loudness of the sound signal is adjusted based on the first frequency domain signal, the frequency response information of the current electronic equipment and the target loudness to obtain the target sound signal of the multimedia resource, no fluctuated sound will appear, and the frequency response information of the electronic equipment is considered, the obtained loudness of the target sound signal is more conforming to the anticipations, and is more conforming to the auditory characteristic of the user, and the playing effect is better.

Through the above step S21 to step S26, the electronic equipment adjusts loudness of the sound signal of the multimedia resource, to obtain the target sound signal, and when receiving the playing instructions of the multimedia resource, the electronic equipment can play the target sound signal of the multimedia resource, in this way, in the process of acquiring the target sound signal, the frequency response information of the current electronic equipment is considered, the obtained loudness when the target sound signal is played is closer to the target loudness, and can match with the auditory characteristic of the user, and the effect is better.

In the embodiment of the present application, the frequency response information of the current electronic equipment is considered, the original signal is converted into the frequency domain signal which can embody the loudness of the signal when the signal is played on the current electronic equipment, then the original signal is adjusted based on the frequency domain signal and the target loudness, the loudness of the adjusted sound signal when the sound signal is played on the current electronic equipment is close to the target loudness, rather than merely adjusting the loudness of the sound signal itself to match with the auditory characteristic of the user, moreover, the loudness of the target sound signal is adjusted based on the target loudness, and when multiple multimedia resources are adjusted, the obtained loudness is consistent, therefore, the problem of fluctuated sounds heard by the user can be effectively solved, and the loudness adjustment effect is favorable.

Figure 6:
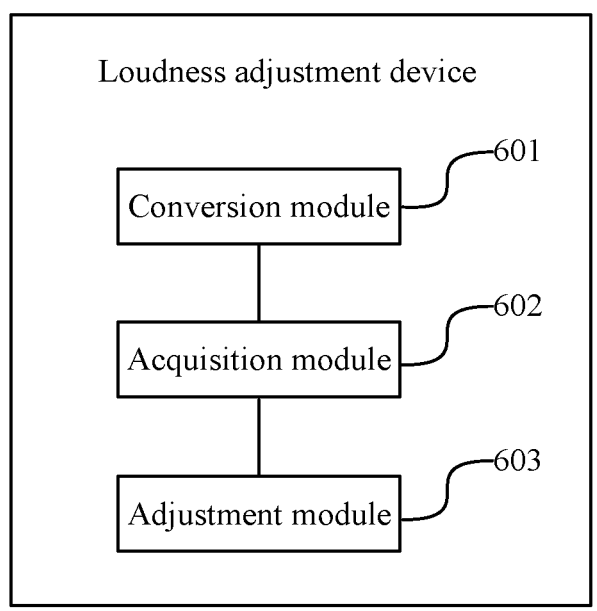
FIG. 6 is a block diagram of a device for adjusting loudness according to an exemplary embodiment.

FIG. 6 is a block diagram of a device for adjusting loudness according to an exemplary embodiment. Please refer to FIG. 6, the device includes a conversion module 601, an acquisition module 602 and an adjustment module 603.

The conversion module 601 is configured to convert a sound signal of a multimedia resource into a first frequency domain signal.

The acquisition module 602 is configured to acquire the second frequency domain signal based on the first frequency domain signal and the frequency response information of the current electronic equipment, wherein the second frequency domain signal is configured to embody the loudness of the first frequency domain signal when the first frequency domain signal is played on the current electronic equipment.

The adjustment module 603 is configured to adjust the loudness of the sound signal based on the second frequency domain signal and the target loudness to obtain the target sound signal of the multimedia resource.

In some embodiments, the acquisition module 602 is configured to: acquire the third frequency domain signal based on the first frequency domain signal and the first information of the current electronic equipment, wherein the first information is configured to embody the change of the amplitude of the sound signal along with the change of frequency; and acquire the second frequency domain signal based on the third frequency domain signal and the second information of the current electronic equipment, wherein the second information is configured to embody the change of the loudness of the sound signal along with the change of frequency.

In some embodiments, the adjustment module 603 is configured to: acquire the loudness adjustment value of the sound signal based on the second frequency domain signal and the target loudness; and adjust the loudness of the sound signal based on the loudness adjustment value, to obtain a target sound signal of the multimedia resource.

In some embodiments, the adjustment module 603 is configured to: acquire a maximum value and an average value of the loudness of the second frequency domain signal; and acquire the loudness adjustment value of the sound signal based on the maximum value, the average value and the target loudness.

In some embodiments, the adjustment module 603 is configured to: acquire the first difference value between the target loudness and the average value; acquire the second difference value between a loudness threshold and the maximum value; and acquire the loudness adjustment value of the sound signal based on the first difference value and the second difference value.

In some embodiments, the adjustment module 603 is configured to: perform weighted summation on the first difference value and the second difference value when the first difference value and the second difference value satisfy a target condition, to obtain the loudness adjustment value of the sound signal, where the target condition is that the first difference value is greater than or equal to 0 and the first difference value is greater than the second difference value; or, acquire the first difference value as the loudness adjustment value of the sound signal when the first difference value and the second difference value do not satisfy the target condition.

In some embodiments, the adjustment module 603 is configured to: acquire a threshold of a compressor based on the loudness threshold and the loudness adjustment value; acquire the gain value of the compressor based on the loudness adjustment value; and input the sound signal to the compressor, adjust, by the compressor, the loudness of the sound signal based on the threshold and the gain value, and output the target sound signal of the multimedia resource.

In some embodiments, the adjustment module 603 is further configured to adjust the loudness of the at least one frame of target sound signal to the loudness threshold when the target sound signal includes at least one frame of target sound signal with the loudness being greater than the loudness threshold.

In some embodiments, the adjustment module 603 is further configured to input the target sound signal to a limiter, adjust, by the limiter, at least one frame of target sound signal, with the loudness being greater than the loudness threshold, in the target sound signal, and output the adjusted target sound signal.

In the device provided in the embodiment of the present application, the frequency response information of the current electronic equipment is considered, the original signal is converted into the frequency domain signal which can embody the loudness of the signal when the signal is played on the current electronic equipment, then the original signal is adjusted based on the frequency domain signal and the target loudness, the loudness of the adjusted sound signal when the sound signal is played on the current electronic equipment is close to the target loudness, rather than merely adjusting the loudness of the sound signal itself to match with the auditory characteristic of the user, moreover, the loudness of the target sound signal is adjusted based on the target loudness, and when multiple multimedia resources are adjusted, the obtained loudness is consistent, therefore, the problem of fluctuated sounds heard by the user can be effectively solved, and the loudness adjustment effect is favorable.

As to the equipment in the above embodiments, the specific manners through which each module performs operations have been described in detail in the embodiments related to the method, and will not be described in detail herein.

The above electronic equipment can be provided as a terminal as shown in the following FIG. 7, and can also be provided as the server as shown in the following FIG. 8, which will not be defined in the embodiment of the present application.

Figure 7:
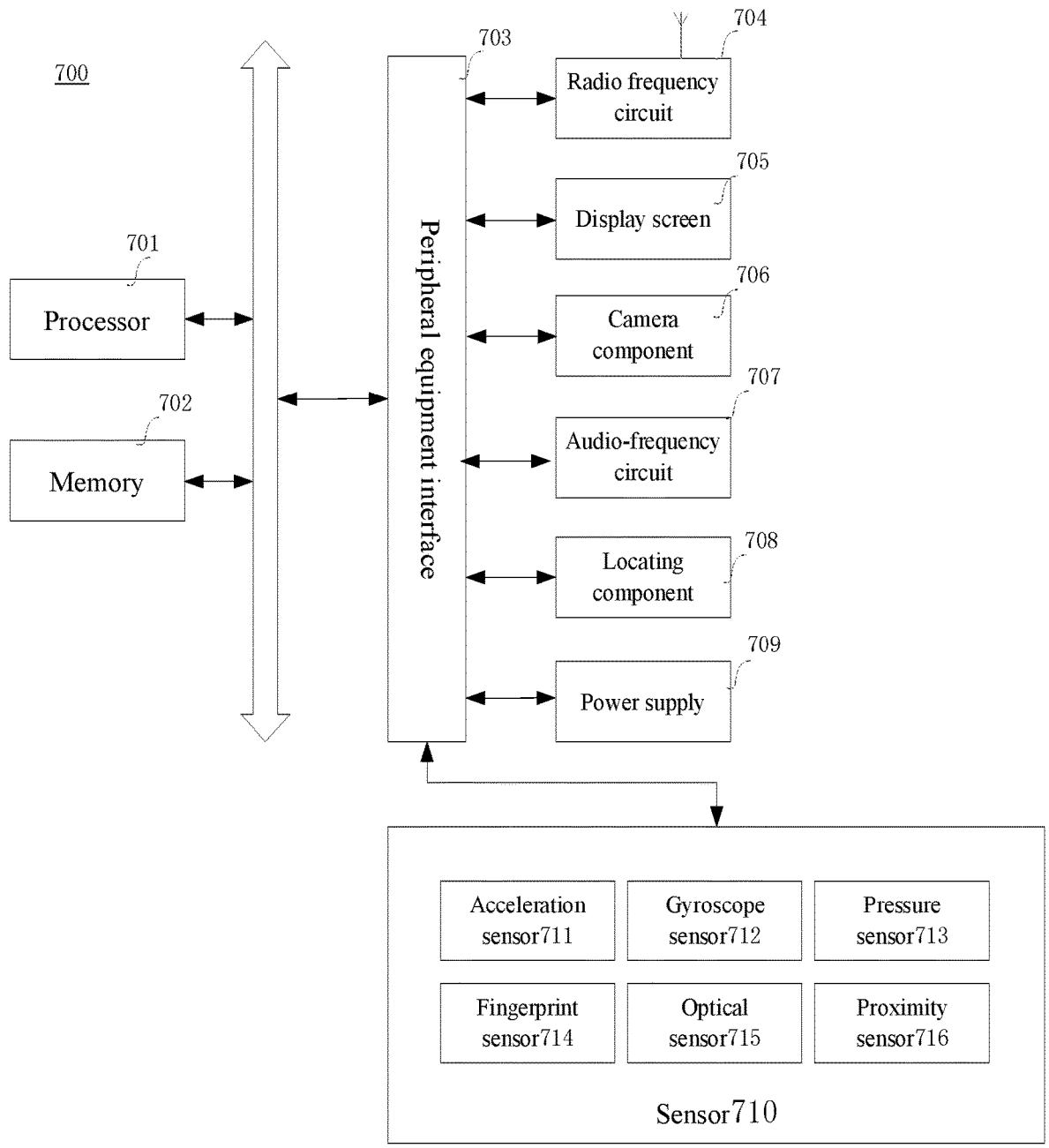
FIG. 7 is a structural block diagram of a terminal according to an exemplary embodiment.

FIG. 7 is a structural block diagram of a terminal shown according to an exemplary embodiment. The terminal 700 can be a smart phone, a tablet computer, a moving picture experts group audio layer III (MP3), a moving picture experts group audio layer IV (MP4), a notebook computer or a desktop computer. The terminal 700 can further be called user equipment, a portable terminal, a kneetop terminal, a desktop terminal and other names.

Generally, the terminal 700 includes: a processor 701 and a memory 702.

The processor 701 can include one or more processing cores, such as a quad-core processor or an eight-core processor. The processor 701 can be realized by utilizing at least one hardware forms selected from digital signal processing (DSP), field-programmable gate array (FPGA), and programmable logic array (PLA). The processor 701 can further include a main processor and a coprocessor, wherein the main processor is a processor configured to process the data in a wake state, and is also called a central processing unit (CPU); the coprocessor is a processor with low power consumption and configured to process the data under a standby state. In some embodiments, the processor 701 can be integrated with a graphics processing unit (GPU), and the GPU is configured to be responsible for the rendering and drawing of contents needing to be displayed by a display screen. In some embodiments, the processor 701 can further include an artificial intelligence (AI) processor, and the AI processor is configured to process computing operations related to machine learning.

The memory 702 can include one or more computer readable storage media, and the computer readable storage media can be non-transient. The memory 702 can further include a high-speed random access memory, and a non-volatile memory, for example, one or more disk storage devices and flash storage devices. In some embodiments, the non-transient computer readable storage medium in the memory 702 can be configured to store at least one instruction, and the at least one instruction is executed by the processor 701 to realize the loudness adjustment method provided in the method embodiment of the present application.

In some embodiments, the terminal 700 can further optionally include: a peripheral equipment interface 703 and at least one peripheral equipment. The processor 701, the memory 702 and the peripheral equipment interface 703 can be connected through a bus or a signal line. Each peripheral equipment can be connected with the peripheral equipment interface 703 through a bus, a signal line or a circuit board. In some embodiments, the peripheral equipment includes: at least one of a radio frequency circuit 704, a display screen 705, a camera component 706, an audio-frequency circuit 707, a locating component 708 and a power supply 709.

The peripheral equipment interface 703 can be configured to connect at least one peripheral equipment related to input/output (I/O) to a processor 701 and a memory 702. In some embodiments, the processor 701, the memory 702 and the peripheral equipment interface 703 are integrated on the same chip or circuit board; in some other embodiments, any one or two of the processor 701, the memory 702 and the peripheral equipment interface 703 can be realized on a separate chip or circuit board, which is not defined in the present embodiment.

The radio frequency circuit 704 is configured to receive and transmit radio frequency (RF) signals, also known as electromagnetic signals. The radio frequency circuit 704 communicates with the communication network and other communication devices through electromagnetic signals. The radio frequency circuit 704 converts the electric signals into electromagnetic signal to transmit, or, converts the received electromagnetic signals into electric signals. Optionally, the radio frequency circuit 704 includes: an antenna system, an RF transceiver, one or more amplifiers, a tuner, an oscillator, a digital signal processor, a codec chipset, a subscriber identity module card, etc. The radio frequency circuit 704 can communicate with other terminals through at least one wireless communication protocol. The wireless communication protocol includes but is not limited to: a metropolitan area network, each generation of mobile communication network (2G, 3G, 4G and 5G), a wireless local area network and/or a wireless fidelity (WiFi) network. In some embodiments, the radio frequency circuit 704 can further include near field communication (NFC) related circuits, which is not defined in the present application.

The display screen 705 is configured to display a user interface (UI). The UI can include graphics, texts, icons, videos or any arbitrary combination thereof. When the display screen 705 is a touch display screen, the display screen 705 further possesses the capability of collecting touch signals on the surface or above the surface of the display screen 705. The touch signal can be taken as a control signal to be input into the processor 701 for processing. At this time, the display screen 705 is further configured to provide virtual buttons and/or virtual keyboards, also known as soft buttons and/or soft keyboards. In some embodiments, one display screen 705 can be available and set at the front panel of the terminal 700; in some other embodiments, at least two display screens 705 can be available and can be respectively arranged at different surfaces of the terminal 700 or designed in a folded manner; in still some other embodiments, the display screen 705 can be a flexible display screen and arranged on the bent surface or folded surface of the terminal 700. Even, the display screen 705 can also be arranged to be a non-rectangular irregular figure, that is, a special-shaped screen. The display screen 705 can be prepared by adopting such materials as a liquid crystal display (LCD) screen or an organic light-emitting diode (OLED).

The camera component 706 is configured to collect images or videos. Optionally, the camera component 706 includes a front camera and a rear camera. Generally, the front camera is arranged at a front panel of the terminal, while the rear camera is arranged at the back side of the terminal. In some embodiments, at least two rear cameras are available, which are respectively any one of a main camera, a depth-of-field camera, a wide angle camera, and a telephoto camera, such that the main camera is merged with the depth-of-field camera to realize the Bokeh function, and the main camera is mixed with the wide angle camera to realize panorama shooting and virtual reality (VR) shooting function or other merged shooting functions. In some other embodiments, the camera component 706 can further include a flashlight. The flashlight can be a single-color-temperature flashlight, and can also be a dual-color-temperature flashlight. The dual-color-temperature flashlight can be a combination of a warm-light flashlight and a cold-light flashlight, and can be used for light compensation under different color temperatures.

The audio-frequency circuit 707 can include a microphone and a loudspeaker. The microphone is configured to collect sound waves of the user and environment, and convert the sound waves into electric signals and input into the processor 701 for processing, or input into a radio frequency circuit 704 to realize speech communication. For the purpose of collection of stereophonic sounds or noise reduction, multiple microphones can be available and can be respectively arranged at different parts of the terminal 700. The microphone can also be an array microphone or an omnidirectional collection microphone. The loudspeaker is configured to convert electric signals from the processor 701 or the radio frequency circuit 704 into sound waves. The loudspeaker can be a traditional film speaker, and can also be a piezoelectric ceramic loudspeaker. When the loudspeaker is a piezoelectric ceramic loudspeaker, not only electric signals can be converted into sound waves capable of being heard by human beings, but also the electric signals can be converted into sound waves which cannot be heard by human beings for such applications as ranging. In some embodiments, the audio-frequency circuit 707 can further include a headset jack.

The location module 708 is configured to locate the current geographic position of the terminal 700, to realize navigation or location based service (LBS). The location component 708 can be a locating component based on the American global positioning system (GPS), China's Beidou system, Russian Glonass system, or the Galileo system of the European Union.

The power supply 709 is configured to supply power to each component in the terminal 700. The power supply 709 can be alternating current, direct current, primary batteries or rechargeable batteries. When the power supply 709 includes rechargeable batteries, the rechargeable batteries can support wired charging or wireless charging. The rechargeable batteries can further be configured to support the quick charge technology.

In some embodiments, the terminal 700 further includes one or more sensors 710. The one or more sensors 710 include but are not limited to: an acceleration sensor 711, a gyroscope sensor 712, a pressure sensor 713, a fingerprint sensor 714, an optical sensor 715 and a proximity sensor 716.

The acceleration sensor 711 can detect the magnitude of acceleration on three coordinate axes of a coordinate system established with the terminal 700. For example, the acceleration sensor 711 can be configured to detect the component of the gravitational acceleration on three coordinate axes. The processor 701 can control the display screen 705 to display the user interface with a horizontal view or a vertical view according to the gravitational acceleration signals collected by the acceleration sensor 711. The acceleration sensor 711 can further be used for games or collection of motion data of users.

The gyroscope sensor 712 can detect the engine body direction and rotating angle of the terminal 700, and the gyroscope sensor 712 can be coordinated with the acceleration sensor 711 to collect 3D actions of the user on the terminal 700. The processor 701 can realize the following functions according to the data collected by the gyroscope sensor 712: motion sensing (for example, UI is changed according to inclined operation of the user), image stability during shooting, game control and inertia navigation.

The pressure sensor 713 can be arranged at a side frame of the terminal 700 and/or the lower layer of the display screen 705. When the pressure sensor 713 is arranged at the side frame of the terminal 700, the holding signal of user on the terminal 700 can be detected, and the processor 701 performs recognition of left and right hands or quick operations according to the holding signals collected by the pressure sensor 713. When the pressure sensor 713 is arranged at the lower layer of the display screen 705, the processor 701 controls the operable controls on the UI interface according to the pressure operation of the user on the display screen 705. Operable controls include at least one of the button control, scroll-bar control, icon control and menu control.

The fingerprint sensor 714 is configured to collect fingerprints of a user, and the processor 701 recognizes the identity of the user according to the fingerprints collected by the fingerprints sensor 714, or, the fingerprint sensor 714 recognizes the identity of the user according to collected fingerprints. When the identity of the user is recognized to be a credible identity, the processor 701 authorizes the user to perform related sensitive operation, and the sensitive operation includes unlocking the screen, viewing encrypted information, downloading software, paying and changing settings. The fingerprint sensor 714 can be arranged on the front face, back face or side face of the terminal 700. When the terminal 700 is set with physical buttons or Logo of the manufacturer, the fingerprint sensor 714 can be integrated with the physical buttons or Logo of the manufacturer.

The optical sensor 715 is configured to collect ambient light strength. In one embodiment, the processor 701 can control the display brightness of the display screen 705 according to the ambient light strength collected by the optical sensor 715. In some embodiments, when the ambient light strength is high, the display brightness of the display screen 705 is turned up; when the ambient light strength is low, the display brightness of the display screen 705 can be turned down. In another embodiment, the processor 701 can further dynamically adjust the shooting parameters of the camera component 706 according to the ambient light strength collected by the optical sensor 715.

The proximity sensor 716, also known as a distance sensor, is generally arranged at the front panel of the terminal 700. The proximity sensor 716 is configured to collect the distance between the user and the front side of the terminal 700. In one embodiment, when the proximity sensor 716 detects that the distance between the user and the front side of the terminal 700 is gradually decreased, the processor 701 controls the display screen 705 to switch into a screen-off state from a bright screen state, and when the proximity sensor 716 detects that the distance between the user and the front side of the terminal 700 is gradually increased, the processor 701 controls the display screen 705 to switch into a bright screen state from a screen-off state.

Those skilled in the art can understand that, the structure shown in FIG. 7 does not constitute a limitation to the terminal 700, can include more or less components than those in the figure, or combine with some components, or adopt different components for arrangement.

Figure 8:
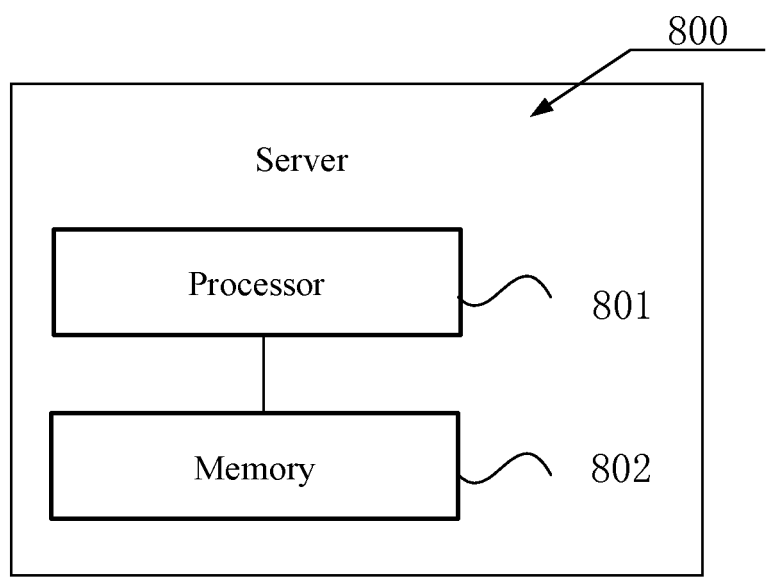
FIG. 8 is a structural schematic diagram of a server according to an exemplary embodiment.

FIG. 8 is a structural schematic diagram of a server shown in an exemplary embodiment. The server 800 can vary greatly due to different configurations or properties, can include one or more central processing units (CPU) 801 and one or more memories 802, wherein the memory 802 stores at least one instruction, the at least one instruction is loaded and executed by the processor 801 to realize the loudness adjustment method provided in each above method embodiment. In some embodiments, the server can further be provided with a wired or a wireless network interface, a keyboard, an input/output interface and other components, so as to input and output, and the server can further include other components configured to realize the equipment function, which are not repeated redundantly herein.

In an exemplary embodiment, a non-temporary computer readable storage medium is further provided. When the instructions in the non-temporary computer readable storage medium is executed by the processor of electronic equipment, the electronic equipment can perform one loudness adjustment method, and the method includes: converting the sound signals of the multimedia resources into a first frequency domain signal; acquiring a second frequency domain signal based on the first frequency domain signal and the frequency response information of the current electronic equipment, wherein the second frequency domain signal is configured to embody the loudness of the first frequency domain signal when the first frequency domain signal is played on the current electronic equipment; and adjusting the loudness of the sound signal based on the second frequency domain signal and the target loudness, to obtain the target sound signals of the multimedia resource.

In an exemplary embodiment, an application is further provided. The application includes one or more instructions, and the one or more instructions can be executed by the processor of the electronic equipment, to finish the method steps of the loudness adjustment method provided in the above embodiment, and the method steps can include: converting the sound signals of the multimedia resources into a first frequency domain signal; acquiring a second frequency domain signal based on the first frequency domain signal and the frequency response information of the current electronic equipment, wherein the second frequency domain signal is configured to embody the loudness of the first frequency domain signal when the first frequency domain signal is played on the current electronic equipment; and adjusting the loudness of the sound signal based on the second frequency domain signal and the target loudness, to obtain the target sound signals of the multimedia resource.

Those skilled in the art will easily conceive of other embodiments of the present application after considering the description and practicing the invention disclosed herein. The present application aims at encompassing any variation, application or adaptive changes of the present application, and these variations, applications or adaptive changes abide by the generalized principles of the present application and include common knowledge or customary technical means in the technical field not disclosed in the present application. The description and the embodiments are merely regarded as exemplary, and the real scope and spirit of the present application are pointed out by the following claims.

It should be understood that, the present application is not limited to the precise structure described above and shown in the figures, and can make various modifications and variations without departing from its scope. The scope of the present application is only limited by the appended claims.

What is claimed is:

1. A method for adjusting loudness, comprising:
   converting a sound signal of a multimedia resource into a first frequency domain signal;
   acquiring a third frequency domain signal based on the first frequency domain signal and first information of current electronic equipment, wherein the first information is configured to embody the change of an amplitude of the sound signal along with the change of a frequency; and
   acquiring the second frequency domain signal based on the third frequency domain signal and second information of the current electronic equipment, wherein the second information is configured to embody the change of the loudness of the sound signal along with the change of the frequency, wherein the second frequency domain signal is configured to embody loudness of the first frequency domain signal when the first frequency domain signal is played on the current electronic equipment; and
   obtaining a target sound signal of the multimedia resource by adjusting loudness of the sound signal based on the second frequency domain signal and target loudness.

2. The method according to claim 1, wherein said obtaining the target sound signal of the multimedia resource by adjusting the loudness of the sound signal based on the second frequency domain signal and the target loudness comprises:
   acquiring a loudness adjustment value of the sound signal based on the second frequency domain signal and the target loudness; and
   obtaining the target sound signal of the multimedia resource by adjusting the loudness of the sound signal based on the loudness adjustment value.

3. The method according to claim 2, wherein said acquiring the loudness adjustment value of the sound signal based on the second frequency domain signal and the target loudness comprises:
   acquiring a maximum value and an average value of loudness of the second frequency domain signal; and
   acquiring the loudness adjustment value of the sound signal based on the maximum value, the average value and the target loudness.

4. The method according to claim 3, wherein said acquiring the loudness adjustment value of the sound signal based on the maximum value, the average value and the target loudness comprises:
   acquiring a first difference value between the target loudness and the average value;
   acquiring a second difference value between a loudness threshold and the maximum value; and
   acquiring the loudness adjustment value of the sound signal based on the first difference value and the second difference value.

5. The method according to claim 4, wherein said acquiring the loudness adjustment value of the sound signal based on the first difference value and the second difference value comprises:
   acquiring the loudness adjustment value of the sound signal by weighting and summing the first difference value and the second difference value when the first difference value and the second difference value satisfy a target condition, wherein the target condition is that the first difference value is greater than or equal to 0 and the first difference value is greater than the second difference value; or,
   determining the first difference value as the loudness adjustment value of the sound signal when the first difference value and the second difference value do not satisfy the target condition.

6. The method according to claim 2, wherein said obtaining the target sound signal of the multimedia resource by adjusting the loudness of the sound signal based on the loudness adjustment value comprises:
   acquiring a threshold of a compressor based on a loudness threshold and the loudness adjustment value;
   acquiring a gain value of the compressor based on the loudness adjustment value; and
   inputting the sound signal to the compressor, and obtaining the target sound signal of the multimedia resource by adjusting, by the compressor, the loudness of the sound signal based on the threshold and the gain value.

7. The method according to claim 6, further comprising:
   when the target sound signal comprises at least one frame of target sound signal with loudness being greater than the loudness threshold, adjusting the loudness of the at least one frame of target sound signal to the loudness threshold.

8. The method according to claim 7, wherein said when the target sound signal comprises at least one frame of target sound signal with the loudness being greater than the loudness threshold, adjusting the loudness of the at least one frame of target sound signal to the loudness threshold comprises:
   inputting the target sound signal to a limiter, outputting adjusted target sound signal by adjusting, by the limiter, the at least one frame of target sound signal, with the loudness being greater than the loudness threshold, in the target sound signal.

9. Electronic equipment, comprising:
   one or more processors; and
   one or more memories configured to store instructions executed by the one or more processors;
   wherein the one or more processors are configured to execute the instructions to enable the one or more processors to:
   convert a sound signal of a multimedia resource into a first frequency domain signal;
   acquire a third frequency domain signal based on the first frequency domain signal and first information of current electronic equipment, wherein the first information is configured to embody the change of an amplitude of the sound signal along with the change of a frequency; and acquire the second frequency domain signal based on the third frequency domain signal and second information of the current electronic equipment, wherein the second information is configured to embody the change of the loudness of the sound signal along with the change of the frequency, wherein the second frequency domain signal is configured to embody loudness of the first frequency domain signal when the first frequency domain signal is played on the current electronic equipment; and obtain a target sound signal of the multimedia resource by adjusting loudness of the sound signal based on the second frequency domain signal and target loudness.

10. The electronic equipment according to claim 9, wherein the one or more processors are configured to execute the instructions to enable the one or more processors to:

acquire the loudness adjustment value of the sound signal based on the second frequency domain signal and the target loudness; and obtain the target sound signal of the multimedia resource by adjusting the loudness of the sound signal based on the loudness adjustment value.

11. The electronic equipment according to claim 10, wherein the one or more processors are configured to execute the instructions to enable the one or more processors to:

acquire a maximum value and an average value of loudness of the second frequency domain signal; and acquire the loudness adjustment value of the sound signal based on the maximum value, the average value and the target loudness.

12. The electronic equipment according to claim 11, wherein the one or more processors are configured to execute the instructions to enable the one or more processors to:

acquire the first difference value between the target loudness and the average value;

acquire the second difference value between a loudness threshold and the maximum value; and acquire the loudness adjustment value of the sound signal based on the first difference value and the second difference value.

13. The electronic equipment according to claim 12, wherein the one or more processors are configured to execute the instructions to enable the one or more processors to:

acquire the loudness adjustment value of the sound signal by weighting and summing the first difference value and the second difference value when the first difference value and the second difference value satisfy a target condition, wherein the target condition is that the first difference value is greater than or equal to 0 and the first difference value is greater than the second difference value; or, determine the first difference value as the loudness adjustment value of the sound signal when the first difference value and the second difference value do not satisfy the target condition.

14. The electronic equipment according to claim 10, wherein the one or more processors are configured to execute the instructions to enable the one or more processors to:

acquire a threshold of a compressor based on a loudness threshold and the loudness adjustment value;

acquire the gain value of the compressor based on the loudness adjustment value; and input the sound signal to the compressor, and output the target sound signal of the multimedia resource by adjusting, by the compressor, the loudness of the sound signal based on the threshold and the gain value.

15. The electronic equipment according to claim 14, wherein the one or more processors are configured to execute the instructions to enable the one or more processors to: when the target sound signal comprises at least one frame of target sound signal with loudness being greater than the loudness threshold, adjust the loudness of the at least one frame of target sound signal to the loudness threshold.

16. The electronic equipment according to claim 14, wherein the one or more processors are configured to execute the instructions to enable the one or more processors to: input the target sound signal to a limiter, and output adjusted target sound signal by adjusting, by the limiter, the at least one frame of target sound signal, with the loudness being greater than the loudness threshold, in the target sound signal.

17. A non-transitory computer readable storage medium, wherein when instructions in the non-transitory computer readable storage medium are executed by a processor of electronic equipment, the electronic equipment performs the method of claim 1.

* * * * *